United States Patent [19]

Blaney

[11] Patent Number: 4,694,583
[45] Date of Patent: Sep. 22, 1987

[54] ELECTRONIC AUTOMOTIVE COMPASS AND DISPLAY

[75] Inventor: Peter G. Blaney, Walnut Creek, Calif.

[73] Assignee: Zemco Group, Inc., San Ramon, Calif.

[21] Appl. No.: 844,175

[22] Filed: Mar. 26, 1986

[51] Int. Cl.⁴ ............................................. G01C 17/30
[52] U.S. Cl. ........................................ 33/361; 33/348
[58] Field of Search ................... 33/361, 348, 363 R, 33/360, 363 K, 363 L, 363 M, 363 Q, 329, 330, 328, 351

[56] References Cited

U.S. PATENT DOCUMENTS

| | | | |
|---|---|---|---|
| 3,905,121 | 9/1975 | Takeda et al. | 33/361 |
| 3,935,645 | 2/1976 | Okamoto et al. | 33/363 R |
| 4,373,271 | 2/1983 | Nitz | 33/361 |
| 4,402,142 | 9/1983 | Dinsmore | 33/363 R |

Primary Examiner—William D. Martin, Jr.
Attorney, Agent, or Firm—Owen, Wickersham & Erickson

[57] ABSTRACT

An electronic display device for presenting directional information to the operator of a motor vehicle. The display simultaneously shows current vehicle direction of travel as well as the relative directions of the 4 major compass axes by converting the direction information from an electronic flux gate compass. The device is further optimized to reduce the number of pin connections to the display and associated driver complexity and is readily applicable to LED, LCD or vacuum fluorescent type display elements.

15 Claims, 10 Drawing Figures

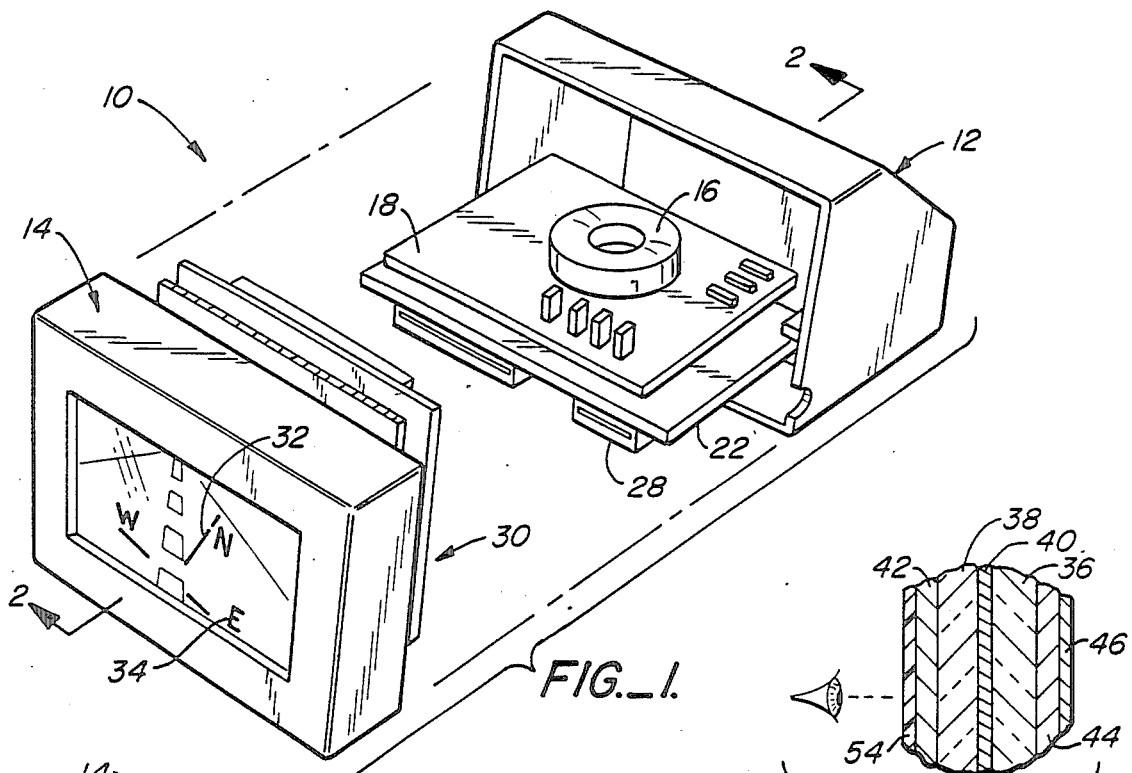
FIG._1.
FIG._2A.
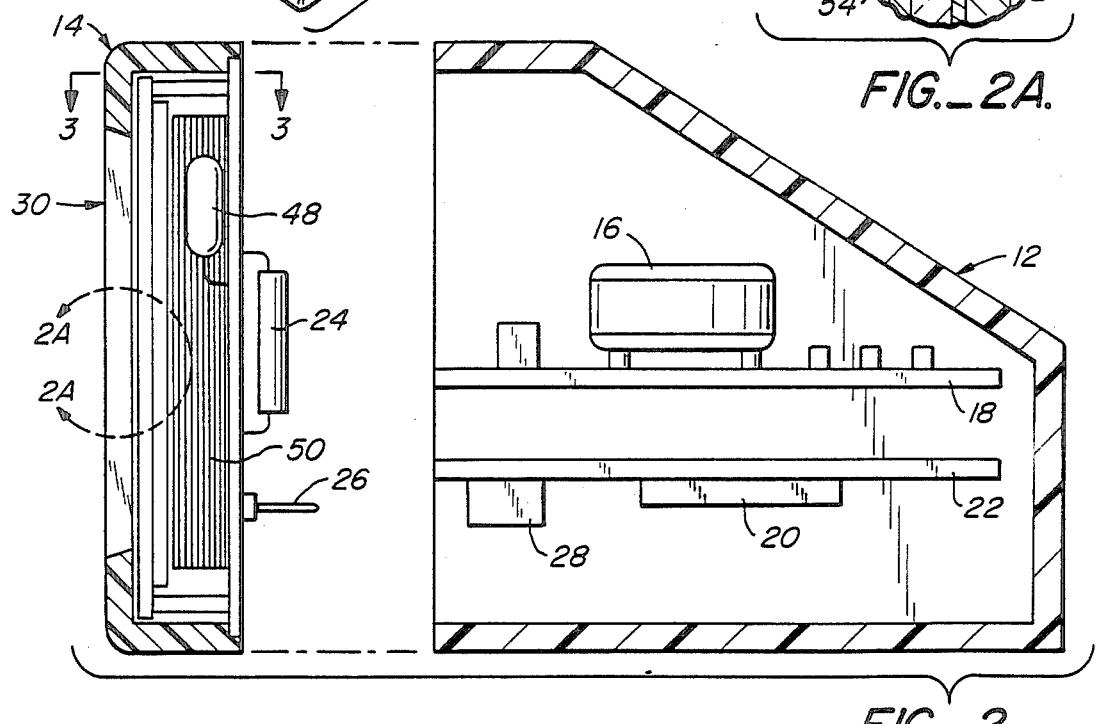
FIG._2.
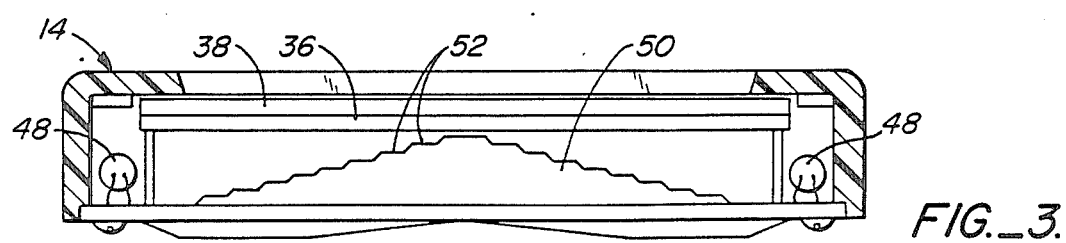
FIG._3.

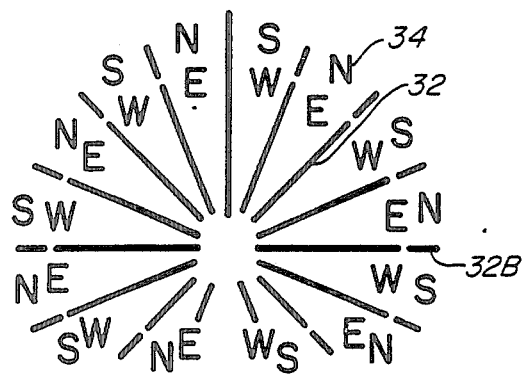
FIG._4.
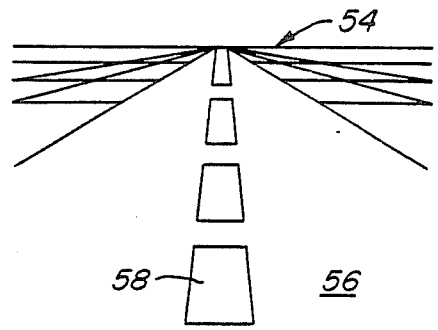
FIG._5.
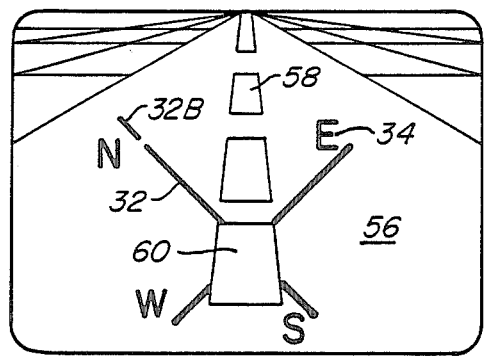
FIG._7.
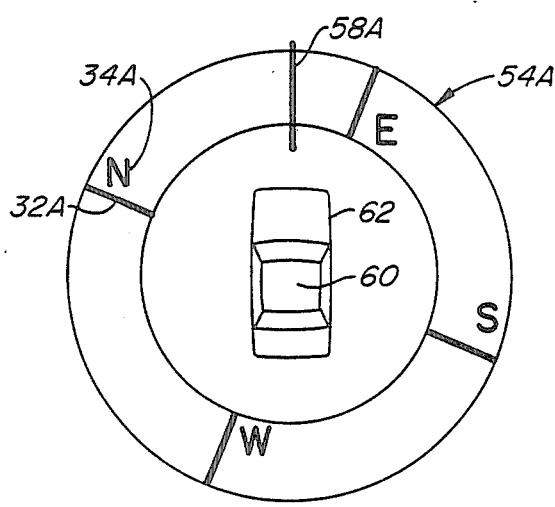
FIG._8.
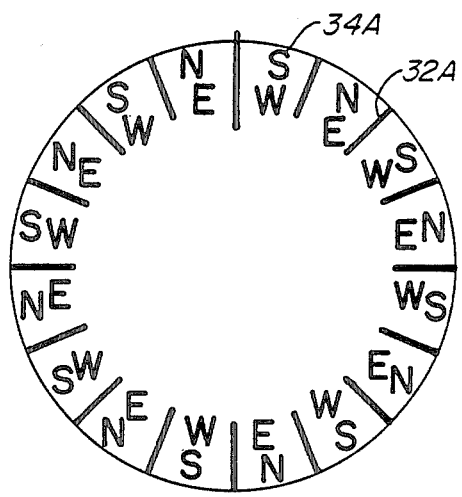
FIG._9.

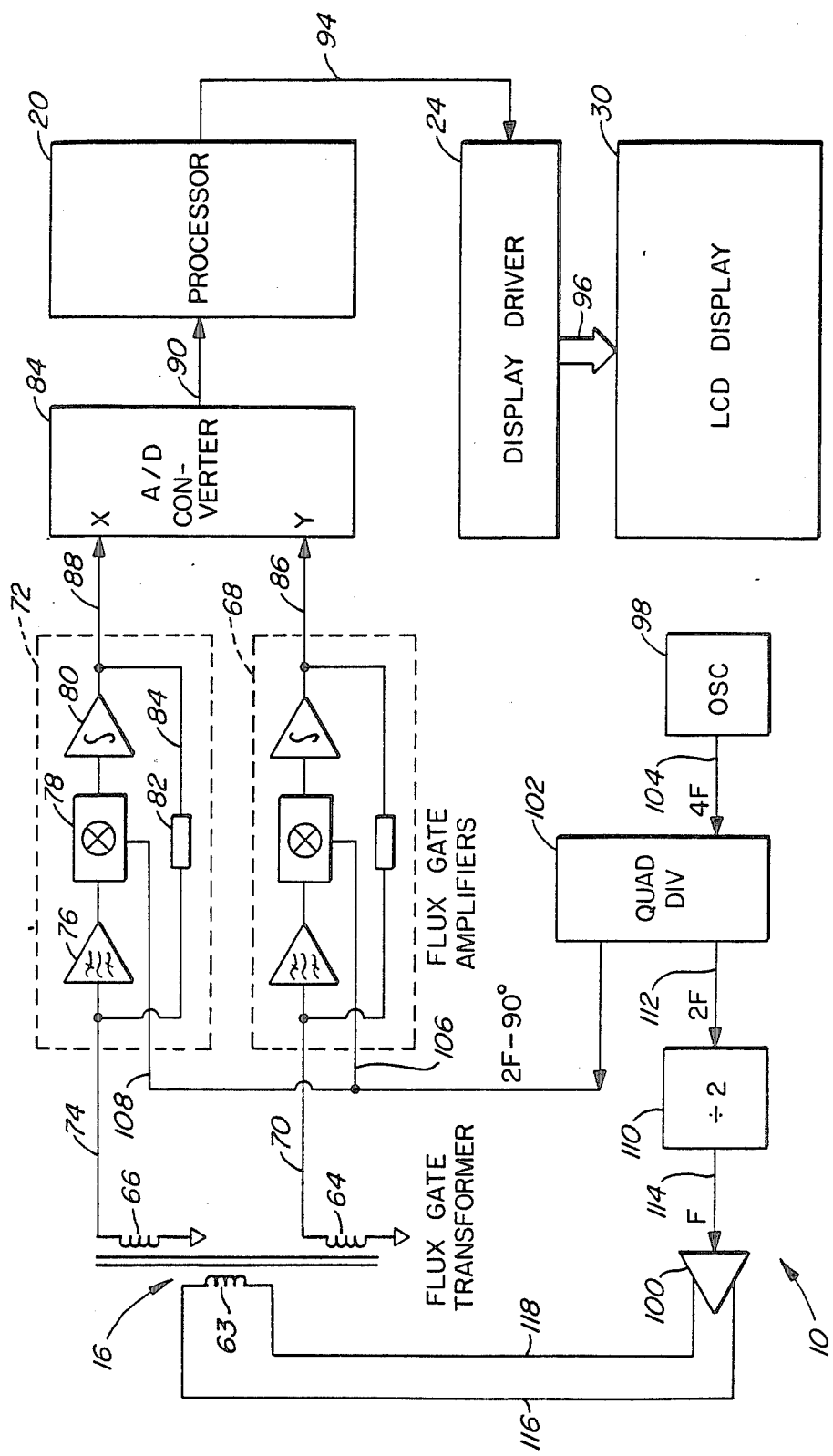
FIG._6.

ELECTRONIC AUTOMOTIVE COMPASS AND DISPLAY

This invention relates to compasses and more particularly to an electronic compass and display therefor especially adaptable for use in automobiles.

BACKGROUND OF THE INVENTION

The magnetic compass has been a standard accessory on various vehicles ever since its introduction. Although not as necessary a navigational instrument as it is in a boat or an airplane, the compass is a very useful instrument for an automobile when traveling in an unfamiliar territory. However, since the compass is not so vital an instrument in an automobile, little attention was previously given to improving its readability.

In the traditional magnetic compass, a magnetic bar was attached to a display disk having a center pivot. The disk and magnet were suspended in a damping fluid to reduce oscillations of the display while turning or encountering external vibrations. The method of marking the disk for indicating the direction greatly affected the manner in which directional information was conveyed to the user. Several types of displays have heretofore been utilized. In one arrangement, the disk is flat and marked in the usual North, South, East and West orientations. The direction is indicated by a fixed reference line (lubber line) at the top of the disk. Since the disk is horizontal, the display must be viewed from the top. This arrangement will give an overall view of the direction the vehicle is traveling and where the desired directions are relative to the current heading. This type of compass display is usually found on large boats where space is not a premium and the compass can be placed so that the operator can easily view the compass disk from above.

In an airplane or automobile, where it is not practical to place the compass in a location where it can be viewed from the top, the display must be arranged differently. For example, the compass disk may be a cylinder or half sphere with the legends printed around the edge. Here the direction is indicated by the lubber line which is placed between the cylinder and the observer. The compass legends are rotated 180° to compensate for the position of the lubber line and as a consequence, the relative compass directions are read backwards. For example, if the vehicle is traveling North and the desired direction to travel is North-East, the vehicle must turn to the right 45° but the North-East direction is shown as being 45° to the left of the current direction. Users must adapt to this reversal of directions even though it is not intuitively obvious to the untrained user how to interpret the appropriate direction. In addition, only about one-third of the compass directions are visible at any one time since one cannot see all the way around the cylinder.

Where it is important to view all of the directions simultaneously and to eliminate any directional ambiguity problems as in an airplane, the standard magnetic compass is supplemented with a vertical card directional gyro. The display for the directional gyro is similar to the marine compass described earlier, and the lubber line may be replaced with an airplane symbol. Using the previous example, if the aircraft is traveling north and wishes to turn North-East, both the actual direction and the turn are shown to be 45° to the right. In fact at any time, the directional gyro gives a view of all the compass directions and the relative orientation of the aircraft as it would be seen by an observer from above.

A fourth type of compass display is usually found only on a flux gate or gyro compass on large aircraft and is used as a reference instrument only. It consists of a fixed card which is marked in the normal North, South, East and West orientations and the direction is indicated by a moving pointer which rotates around the disk. Although this display give reasonably comprehensible displays for Northerly headings, the display is reversed for Southerly headings. For example, if the vehicle is traveling South-East and wishes to travel South, the vehicle must turn right, but South is indicated to be to the left of the pointer. One advantage of this type of display is that all of the direction legends are printed right side up and as such are more easily read than the previous display examples.

Having established the shortcomings and limitations of the aforesaid devices, it became apparent that a new and different approach was required in order to provide an improved electronic compass detector with an electronic display system particularly adaptable for automobiles. For such an electronic compass, a particular problem arose of providing a display which would provide the same spatial orientation and functional advantages as the directional gyro display used in modern aircraft. However, in an electronic compass display (i.e., an LED, LCD or vacuum fluorescent display) the presentation is normally not continuous as it is in the mechanical display. Therefore, it must be broken down into discrete segments which can be individually energized by the driving electronics. The choice as to how many segments to divide the compass display into determines the complexity of the display and the driving electronics. Usually the compass is divided into 16 segments yielding a resolution of 22.5° per segment.

To construct an electronic analog of the vertical card compass with 22.5 degree resolution, would require that there be one each of the North, South, East and West legends in each of the 16 locations. This would require 64 driving elements in addition to what would be required to illuminate any reference marks around the display. In addition to the large number of driving elements required, an additional problem with such a display is that the associated legends would have to be so small that they would become unreadable at a distance.

Because of the complexity of duplicating all of the direction labels in all the possible locations for a rotating card type compass display, prior electronic displays appeared as a fixed card with a moving reference, similar to the gyro compass display. Here, the legends can be quite large and readable and the drive requirements for such displays are quite simple, requiring only as many driver outputs as divisions in the compass display (typically 16). However, this prior display retained the problem of directional ambiguity especially for Southern headings.

It is therefore an object of this invention to provide an all electronic compass and a display therefor with an analog of a moving card, fixed reference compass display which gives unambiguous directional information but with the driving simplicity of a fixed card, moving reference display.

Another object of this invention is to provide an electronic compass with a display having an analog of a moving card compass display with large enough legends to allow it to be read from a reasonable distance.

It is a further object of this invention to provide a moving card compass display which keeps all of the direction legends in an upright legible orientation at each location around the compass rose.

It is a further object of this invention to provide a display for an electronic compass which gives a perspective view of the road ahead and the compass directions as they would be seen by the driver of the vehicle in such a way as to provide a display which is intuitively visually realistic and thus readable even to the untrained user.

Another object of the invention is to provide an electronic compass which is accurate, reliable, compact, easy to install and yet highly readable in use.

SUMMARY OF THE INVENTION

In accordance with the principles of the invention, an electronic compass for vehicles is provided with a frontal viewing face that provides a fixed spatial or pseudo-three dimensional presentation of the road ahead of the vehicle which overlays, a multi-character display representative of a compass rose comprised of radial reference bars and associated legends for the major compass points. The latter display is connected to an electronic compass circuit so that appropriate combinations of characters are activated relative to the actual vehicle direction. Thus, the compass face presents to the viewer a graphic representation of the vehicle headed down a road superimposed against a backdrop of the dynamic display showing the major compass points which are constantly oriented and displayed so that the actual direction of vehicle travel can be immediately ascertained.

The compass is of the flux gate type and utilizes a sensitive magnetometer in the form of a flux gate transformer which when driven by a primary coil produces a harmonic output in a pair of secondary coils. This output is proportional to the component of any external magnetic field parallel to the winding axis of the secondary coil. The output from each secondary coil is fed to a flux gate amplifier, and outputs from these amplifiers are digitized and supplied to a microprocessor. The secondary coil axes are wound in orthogonal directions and aligned with the vehicle to measure the magnitude of the earth's field along the longitudinal (X) and lateral (Y) axes of the vehicle. The microprocessor then converts these X and Y components of the earth's magnetic field into an angle, using simple trigonometry that is representative of the actual vehicle direction. To display the current vehicle direction, the microprocessor is programmed, using a look-up table, to convert the computed direction into an appropriate combination of display segments that are activated to illuminate on the display. The resulting combination of on-and-off segments is sent to a display driver which is connected to a display device that includes the display segments, such as a liquid crystal display, by a multiplicity of connections. Thus, as the vehicle is moving and turning, the compass face will constantly provide a representative view of the vehicle headed down a road, the vehicle direction of travel being superimposed on the dynamic display showing reference bars extending radially from the vehicle with associated compass points adjacent the reference bars.

Other objects, advantages and features of the invention will become apparent from the following detailed description of one embodiment thereof presented in conjunction with the accompanying drawing.

BRIEF DESCRIPTION OF THE DRAWING

FIG. 1 is an exploded view in perspective showing an electronic compass according to the present invention;

FIG. 2 is an exploded view in section and in elevation of the compass shown in FIG. 1;

FIG. 2A is an enlarged view in section of the compass display structure;

FIG. 3 is a top view in section taken along line 3—3 of FIG. 2 showing the display section for the compass;

FIG. 4 is a front view of the display showing its activatable bar segments letter legends;

FIG. 5 is a front view of one form of fixed indicia overlay for the compass display;

FIG. 6 is a block diagram of the electronic circuitry for the compass of FIG. 1;

FIG. 7 is a front view of the compass of FIG. 1 showing the display as it appears when activated to indicate vehicle direction;

FIG. 8 is a front view of the compass showing an alternative form of display graphics utilizing the invention;

FIG. 9 is a front view of an alternative form of the display showing its activatable bar segments and letter legends.

DETAILED DESCRIPTION OF EMBODIMENTS

With reference to the drawing, FIGS. 1 and 2 show exploded views of an electronic compass 10 embodying features of the present invention and particularly adapted for use in a vehicle or boat. In the form shown, the compass is comprised of two connectable housing sections 12 and 14 which when normally attached together may be readily mounted at some convenient location such as atop the dash board of an automobile. The housing section 12 contains the electronic circuitry and the section 14 supports a display for the compass. Other housing arrangements for the compass could be provided. For example, the compass electronics may be installed directly within the dashboard or control console of a vehicle with its display section built in at a suitable location within the dash.

The compass 10 operates to measure and display the direction of a vehicle in which it is installed relative to the earth's magnetic field using a highly sensitive magnetometer preferably in the form of a toroidal-shaped flux gate sensor 16. This sensor and associated electronics, which will be described below with reference to FIG. 6, are mounted on a printed circuit board 18 that is retained by the housing section 12. The sensor provides signal outputs relative to the vehicle direction which are processed by a microprocessor 20 mounted on a second printed circuit board 22 located below and electrically connected to the board 18. A display driver 24 is mounted on the display section 14, and when the two housing sections are together, an electrical connection is made by a connector 26 which fits within a receptacle 28 connected to the lower printed circuit board 22.

The processed directional signal data is furnished to a display device 30 which is mounted within the front housing 14. In the embodiment shown, the display device utilizes the principles of a conventional liquid crystal display but with a unique layout array of discrete display elements that include bar segments 32 with adjacent legend letters 34 designating the principle compass directions. As shown in the enlarged sectional view of FIG. 2A, the liquid crystal display device includes a pair of glass plates 36 and 38 which are separated by a thin layer of liquid crystal material 40 in the conventional manner. The bar segments 32 and legend letters 34 are formed as conductive areas on the inside surfaces of each plate, each being conductive by a lead to a contact pad along one side of the display package. In accordance with known liquid crystal technology, a front polarizer sheet 42 covers the front glass plate 38 and a similar polarizer sheet 44 covers the rear glass plate 36. A transreflector sheet 46 is provided adjacent the rear polarizer sheet to improve the display brightness and contrast.

To provide additional display brightness under darkened conditions, light sources 48 such as small incandescent bulbs are provided on opposite sides and slightly to the rear of the liquid crystal display package. These light sources are preferably located adjacent a reflector 50 which, as shown in FIG. 3, has a series of angular steps 52 along its forward contour to provide reflective surfaces that direct light from the sources forwardly through the display to brighten it.

Using the input signals from the sensor 16, the microprocessor 20, (e.g., a National Semiconductor COPS 400 Series 4-bit microcontroller) in accordance with the invention, selects certain combinations of bar segments 32 and letter legends 34 in the display device 30 to be activated (and thus become visible to a viewer) to indicate the existing actual compass directions relative to the vehicle's present line of direction. Superimposed on the front face of the display is an overlay sheet 54 which may be provided by a silk-screen process on a transparent plastic sheet material to give a fixed visual reference for the bar segments 32 and letter legends.

In the embodiment of FIG. 1, the overlay sheet 54, as shown more clearly in FIG. 5 depicts a road 56 with a centerline 58 that extends straight ahead and narrows upwardly on the sheet 54 to represent an exaggerated perspective view of the road ahead of the vehicle. To the driver this represents a view looking out the front window of the vehicle. The lower end of the road centerline passes over a center point 60 on the display from which the compass segments 32 radiate. Thus, to a viewer, the entire display combination as shown in FIG. 7 provides a realistic, spatial representation of the vehicle's line of travel relative to the directions of the nearest compass points, as indicated by the activated bar segments and legends.

In an alternate form of the display format, a modified overlay sheet 54A may be used, as shown in FIG. 8 and in combination with a somewhat modified form of bar segments 32A and letter legends 34A as shown in FIG. 9. Here, an outline FIG. 62 representing a plan view of a vehicle is centrally located over the geometric center 60 of the radiating display bar segments 32A. A fixed centerline 58A extends longitudinally from the vehicle to indicate its actual line of travel. In addition, the bar segments are all of the same length and are spaced radially at a greater distance from their center points, while the letter legends are provided around the entire compass rose. Thus, the angle between vehicle centerline and displayed compass bar segments can be readily seen.

In both embodiments of the display format according to the invention, a unique and particularly efficient arrangement of bar segments and letter legends is provided which minimizes the electrical connections required in the display and yet presents a display format which is highly readable. More specifically, referring to FIG. 9, this feature is accomplished by placing the letter legends between bar segments so that each letter legend can be associated or activated with a bar segment on either side. This reduces the total number of letter legends required to label the bar segments to show 16 different directions from 64 to 32. Further, the N and S letter legends are alternately provided in an outer circle between bar segments the E and W letter legends are alternately provided in an inner concentric circle between bar segments. By associating each outer circle N segments with one and only one inner circle E segment and similarly associating each outer circle S segment with one and only one inner circle W segment, any of the 16 possible directions can be displayed with only 16 connections between the display driver and the letter legend display elements.

Since four bar segments are illuminated for each of the 16 directions, it can be shown that the pattern of bar segments displayed will repeat after each 90° of display direction change. Therefore, only four different patterns of bar segments need to be displayed requiring only four connections between the display driver and bar segments.

The embodiment of the display format shown in FIG. 4 has radial bar segments which extend from the center of the display to the edge of the circle described by the E and W segments. Additionally, there are short bar segments 32B that extend from the edge of the circle described by the E and W segments to the edge of the circle described by the N and S segments. The short bar segments are provided to extend the length of the displayed bar segments when an adjacent N or S letter legend is activated. This improves the display aesthetics and readability by enhancing the major North/South axes and allowing the bar legend to end precisely at the activated letter legend.

In accordance with the invention, the microprocessor 20 is programmed to provide the appropriate combination of bar segments with associated letter legends for the compass direction signals produced from the flux gate sensor 16.

The heart of the compass system is the flux gate sensor or transformer 16. As shown in the block diagram of FIG. 6, this sensor, when driven by its primary coil 63 produces a harmonic output in a pair of secondary coils 64 and 66 which is proportional to the component of any external magnetic field parallel to the winding axis of a secondary coil. The harmonic output of flux gate secondary coil 64 fed to a flux gate amplifier 68 via a lead 70 where it is converted to a voltage proportional to the applied magnetic field. Similarly, the output of the flux gate secondary coil 66 is fed to a flux gate amplifier 72 via a lead 74.

Each flux gate amplifier connected to a flux gate transformer coil is comprised of a band pass amplifier 76 that receives an incoming signal from the secondary coil and produces an output at two times the drive frequency (F). This output is fed to a synchronous demodulator switch 78 which is driven at a frequency of 2F (two times the drive frequency F). The switch output is fed to an integrating amplifier 80 which operates to extract only the 2F signals present at the output of the band pass amplifier 76. A resistor 82 is provided in a feedback lead 84 between the output of the integrator amplifier 80 and the input of the band pass amplifier 76 to linearize the analog output signal from the flux gate amplifier which is representative of the X or Y magnetic field strength.

The output voltages from the flux gate amplifiers are then fed to a multi-channel analog-to-digital converter 84 via leads 86 and 88. This analog-to-digital converter digitizes the measurements of the applied magnetic fields and feeds them to the microprocessor 20 via a lead 90.

The secondary coil axes are wound in orthogonal directions and aligned with the vehicle to measure the magnitude of the earth's field along the longitudinal and lateral axes of the vehicle. The microprocessor 20 then converts these two X and Y components of the earth's magnetic field into an angle using simple trigonometry. To display the current vehicle direction, the microprocessor converts the current direction into an appropriate combination of bar segments 32 and legend letters 34 for illumination on the display device 30 by using a look-up table. The resulting combination of on-and-off segments is sent to the display driver 24 via a lead 94. The output of the display driver is connected to the display device 30 by a multiplicity of connections 96.

An oscillator 98 provides the master switching frequency for the flux gate amplifiers and a power driver 100 at 4 times the fundamental frequency F of the flux gate transformer. The output of oscillator 98 is fed to a quadrature divider 102 via a lead 104. The quadrature divider divides the master oscillator by 2 and produces two outputs at two times the fundamental frequency F, one of which is phase shifted by −90°. This 2F−90° signal is supplied via leads 106 and 108 to the flux gate amplifiers 68 and 72. The 2F zero phase output is fed to a divider 110 via a lead 112. The output of the divider 110 which is now at the fundamental drive frequency F is fed to the power driver 100 via a lead 114. The power driver produces two differential outputs which are connected to the flux gate primary coil 63 via leads 116 and 118. The 2F −90° signal is used to synchronously demodulate the harmonic output of the flux gate secondaries and convert this signal into a voltage proportional to the applied magnetic field.

In use in an automobile, the compass display 30 provides a remarkably simple but highly realistic and easily understood directional reference for the vehicle. Depending on the orientation of the vehicle, the sensor 16 is constantly sending signals to the flux gate amplifiers 68 and 72 whose outputs are digitized and furnished to the microprocessor 20 which then causes the display driver to activate the appropriate combination of four bar segments 32 and their associated letter legends 34 on the display device 30. A driver looking at the display immediately associates the present vehicle position at the center point from which the various display bar segments 32 radiate. The four segments which are presently being activated by signals from the microprocessor together with their associated letter legends 34 at the ends of the segments clearly denote the major compass directions and the vehicle orientation. As the vehicle turns, new appropriate segments are automatically activated by the compass electronics to update the actual compass direction. Thus, the compass display appears as a highly readable moving compass card with a superimposed representation of the vehicle direction of travel.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An electronic compass adapted for installation on a vehicle having a frontal display means for indicating vehicle direction relative to the major compass points and comprising:
    dynamic indicia means including an array of reference bar means angularly spaced apart and extending radially from a common center point and associated letter legend means for indicating the four major compass points adjacent said reference bar means said letter legend means being located between said reference bar means so that each letter legend means can be activated in combination with one adjacent reference bar means on either side thereof;
    fixed indicia means superimposed on said dynamic indicia means including means indicating the actual direction of travel of the vehicle;
    flux gate compass means providing digital outputs proportional to the actual orientation of the vehicle with respect to the earth's magnetic North;
    microprocessor means connected to said compass means for converting said digital compass outputs to directional control signals to activate computed combinations of said reference bar means and associated letter legend means of said dynamic indicia means, thereby making said computed combinations visible and indicating the present orientation of the vehicle relative to the major compass points.

2. The electronic compass as described in claim 1 wherein said dynamic indicia means includes 16 reference bars which extend radially from said center point, said letter legends being located between radiating reference bars in two concentric circles including an outer circle comprised of alternate N and S letters and an inner circle of alternate E and W letters, so that each letter can be activated in combination with one reference bar on either side.

3. The electronic compass as described in claim 2 wherein alternate reference bars in said array include an additional segment spaced from and extending outwardly beyond the outer end of each alternate bar and also adjacent the N and S letters in said outer circle.

4. The electronic compass as described in claim 1 wherein said reference bar means and said letter legend means are embodied in a liquid crystal display device activated by signals from said microprocessor means.

5. The electronic compass as described in claim 4 wherein said fixed indicia means are formed graphically on a transparent overlay sheet attached to the front of said liquid crystal display device.

6. The electronic compass as described in claim 1 wherein said reference bar means are spaced apart at an angle of 22.5°.

7. The electronic compass as described in claim 1 wherein said fixed indicia means depicts a perspective view of a road directly ahead of a vehicle with a centerline that diminishes in thickness from the bottom of the display means to its top.

8. The electronic compass as described in claim 1 wherein said fixed indicia means depicts a plan view of a vehicle, with a line coincident with the vehicle's centerline extending forwardly to indicate the vehicle's direction of travel and said center point for said reference bar means being located within the outline of said vehicle.

9. The electronic compass as described in claim 2 wherein said radial reference bars are formed in two segments, said first segment portion ending at the outer edge of said circle formed by said E and W segments, and said second segment ending at the outer edge of said circle formed by said N and S segments, so that when said reference bars are activated to indicate a North or South compass direction, both segments of said radial reference bars are activated thereby causing all reference bars to extend to a location directly adjacent its associated letter legend.

10. In an electronic compass adapted for installation on a vehicle and having sensor means for producing output signals proportional to the actual orientation of the vehicle with respect to the earth's magnetic North and including electronic means for processing said output signals to provide digitized driving signals, a display device connected to said electronic means for utilizing said driving signals and comprising:

a dynamic indicia means comprised of a plurality of angularly equally spaced apart reference bars extending radially from a center point and a series of letter legends between said bars for indicating the four major compass points, said letter legends N E and S W being located alternately between said reference bars so that single letter legends can be activated in combination with one reference bar either side thereof, said display means being controlled by said driving signals to activate certain of said reference bars and letter legends in combination relative to the present orientation of the vehicle; and a fixed indicia means extending over said dynamic indicia means and including means for indicating the actual direction of the vehicle which passes through said center point.

11. The display device as described in claim 10 wherein said reference bars of said dynamic indicia means are simultaneously activated in groups of four bars spaced 90° apart along with letter legends of the appropriate major compass points adjacent the ends of the activated reference bars.

12. The display device as described in claim 10 wherein said reference bars are each comprised of a relatively long inner segment and a relatively short outer segment, said letter legends being arranged in two concentric circles between said reference bars, with N and S letters being in the outer circle adjacent said outer segments and E and W letters being in the inner circle adjacent the outer ends of said inner segments.

13. The display device as described in claim 12 wherein said fixed indicia means is provided on a transparent overlay sheet covering the front of said dynamic indicia means and comprises a perspective view of a road ahead of the vehicle with a road centerline that extends through said center point.

14. The display device as described in claim 12 wherein said fixed indicia means is provided on a transparent overlay sheet covering the front of said dynamic indicia means and comprises a plan view of a vehicle having a line extending forwardly therefrom and through said center point to indicate the actual vehicle direction of travel.

15. The display device as described in claim 10 wherein a number of said reference bars in a lower sector of said dynamic indicia means below its said center point are truncated in length relative to the remaining reference bars in an upper sector above said center point in order to provide a visual perspective effect.

* * * * *